Nov. 9, 1926.                                           1,606,519
                        R. P. EXTEN
        COMBINATION DRAIN PLUG AND LIQUID FILLING VALVE
                     Filed Jan. 6, 1926
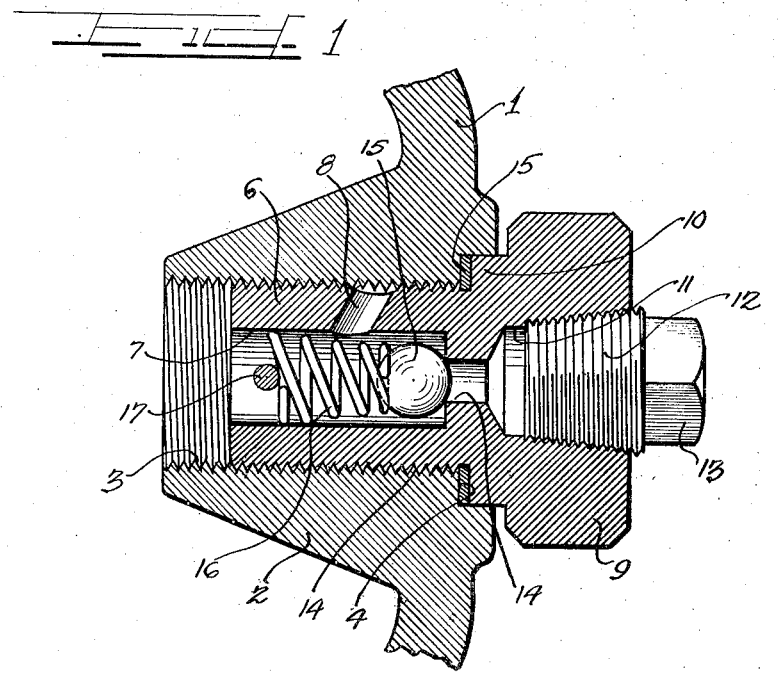
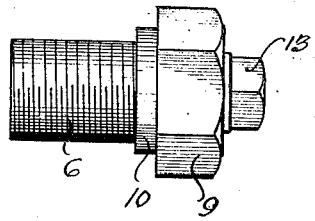  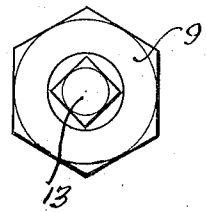
INVENTOR
Rudolph P. Exten
By Charles W. Hill
Attys Patented Nov. 9, 1926.

1,606,519

UNITED STATES PATENT OFFICE.

RUDOLPH P. EXTEN, OF CLINTON, IOWA, ASSIGNOR TO CLIMAX ENGINEERING COMPANY, OF CLINTON, IOWA, A CORPORATION OF DELAWARE.

COMBINATION DRAIN PLUG AND LIQUID-FILLING VALVE.

Application filed January 6, 1926. Serial No. 79,600.

This invention relates primarily to a combination drain plug and liquid filling valve of a type adapted for use in connection with engines, refrigerating machines, compressors, and pumps, said combination plug and valve adapted to serve as a means for draining liquid from a container and also adapted to permit replenishing of the supply of liquid or lubricant under pressure in a container.

It is an object of this invention to provide an improved plug constructed to permit draining of a liquid under pressure in an enclosed vessel or liquid in an open vessel when not under pressure.

It is also an object of this invention to provide a combination plug and valve device adapted to permit replenishment of a liquid under pressure in a container by removing a pipe plug engaged in the head of the main plug.

It is an important object of this invention to provide an improved plug adapted to be removably engaged as a unit in an opening of a compressor housing or the like, said plug having a drain port therein and also being equipped with a spring pressed ball check valve and with a removable pipe plug to afford an arrangement whereby the liquid or lubricant when under pressure within a container may be readily replenished and furthermore affording an arrangement whereby the liquid under pressure in the container may be drained off either slowly or rapidly, depending upon the position of a drain port provided in the plug.

Other and further objects of this invention will be apparent from the disclosures in the specification and accompanying drawings.

The invention in a preferred form is illustrated in the drawings and hereinafter more fully described.

On the drawings:

Figure 1 is an enlarged longitudinal section of a combination plug and valve embodying the principles of this invention with parts shown in elevation and with the combination plug and valve engaged in a threaded opening of a machine housing.

Figure 2 is a reduced side elevation of the combination plug and valve removed from the housing.

Figure 3 is an outer end view of the combination plug and valve.

As shown on the drawings:

The reference numeral 1 indicates a compressor or machine casing or housing provided with an integral boss or extension 2 having an internally threaded passage 3 therein, the outer end of which is enlarged to afford a recess 4, within which a packing ring or washer 5 is adapted to be seated.

The combination plug and valve device of this invention comprises an externally threaded shank or valve body 6 having a chamber 7 therein which opens through the end of said shank. Provided in the wall of the shank 6 is an inclined draining port or passage 8. Integrally formed on one end of the shank 6 is a head 9 provided with a shoulder or boss 10 integrally formed on the inner side of said head. The boss 10 is adapted to engage in the recess 4 of the housing against the packing ring or washer 5, as illustrated in Figure 1. The plug head 9 is provided with a conical threaded recess 11 for the purpose of receiving the tapered externally threaded shank 12 of a pipe plug having a nut head 13 integrally formed on one end thereof. The inner end of the recess 11 in the plug head is of a tapered construction and communicates with a valve passage 14 which connects the chambers 7 and 11. The end of the valve passage 14 connecting up with the inner end of the chamber 7 affords a valve seat for a ball valve 15 which is adapted to be resiliently held against the valve seat by means of a coiled spring 16 positioned within the chamber 7 and having the outer end thereof held in position against a pin 17 engaged transversely through the end of the shank portion 6 of the combination plug and valve device.

The improved combination plug and valve device is adapted to be threaded into the opening 3 of the machine or compressor casing 1 as illustrated in Figure 1 with the boss portion or shoulder 10 of the plug head seated against the packing ring or washer 5 to afford a non-leaking joint. Under normal conditions the coiled spring 16 acts to hold the ball valve 15 seated in the end of the valve passage 14, thereby preventing the escape of liquid and gas from the interior of the housing 1.

When it is desired to admit the liquid or lubricant into the housing 1 the pipe plug 12—13 is removed and a pipe nipple is screwed into its place in the recess 11 of the head 9, said pipe nipple being connected with a suitable pump to permit the liquid or lubricant to be pumped under pressure through the valve passage 14, thereby causing release of the spring controlled ball check valve 15 so that the liquid or lubricant is permitted to enter the interior of the housing 1 when the liquid or lubricant within said housing is under pressure. The ball check valve 15, which is spring controlled, acts automatically to prevent the liquid and gas in the housing 1 from escaping.

In case it is desired to drain a liquid under pressure within the enclosed housing 1 the combination plug and valve device is screwed out of the housing opening 3 and exposed sufficiently to bring the drain port 8 into communication with the recess 4, thereby permitting the liquid or gas to be drained off through the chamber 7 and the drain port 8 either rapidly or slowly, as required, depending upon how much of the outer end of the drain port 8 is exposed.

It will thus be seen that a simplified improved combination drain plug and liquid filling valve device is provided that is adapted for application in various types of engines, refrigerating machines, reciprocating and rotary type compressors, and in pumps and similar mechanical devices to permit draining of a liquid under pressure in an enclosed vessel, or draining of a liquid which is not under pressure in an open vessel, as well as affording an arrangement whereby it is easily possible to replenish the supply of lubricant when under pressure in a housing or container.

I am aware that many changes may be made and numerous details of construction may be varied through a wide range without departing from the principles of this invention and I therefore do not purpose limiting the patent granted hereon otherwise than necessitated by the prior art.

I claim as my invention:

1. A combination plug and valve device comprising a threaded shank having an inclined drain port therein and a chamber opening through one end of said shank, a ball check valve in said chamber, a pin secured to said shank, a coiled spring positioned between said pin and said ball check valve, a chambered head integrally formed on said shank having a valve passage communicating with the chamber in said shank and adapted to receive the ball check valve seated in one end thereof, and a plug member removably engaged in said chambered head whereby liquid may be admitted under pressure.

2. A combination plug and valve device of the class described comprising a plug member having communicating chambers therein, there being an inclined port communicating with one of said chambers, a valve means in said last mentioned chamber for shutting off communication between said chambers, and a plug removably engaged in the other of said chambers.

3. A combination plug and valve device of the class described comprising a plug member having communicating chambers therein, there being an inclined port communicating with one of said chambers, and a valve means in said last mentioned chamber for shutting off communication between said chambers.

4. A combination plug and valve device of the class described comprising a plug member having communicating chambers therein, a valve, there being an inclined drain port communicating with one of said chambers whereby communication may be established between one of said chambers and the exterior of the plug without interference by said valve.

5. The combination with a housing, of a valve body removably associated therewith, a one-way check valve in said valve body, and means independent of said valve for selectively effecting communication between said housing and the exterior thereof by partially removing said valve body from said housing.

In testimony whereof I have hereunto subscribed my name.

RUDOLPH P. EXTEN.